(12) United States Patent
Sakata et al.

(10) Patent No.: US 11,383,615 B2
(45) Date of Patent: Jul. 12, 2022

(54) ELECTRIC POWER SUPPLY SYSTEM, METHOD OF CONTROLLING ELECTRIC POWER SUPPLY SYSTEM, AND CONTROL SYSTEM FOR HYBRID ELECTRIC VEHICLE

(71) Applicant: SUBARU CORPORATION, Tokyo (JP)

(72) Inventors: Shinnosuke Sakata, Tokyo (JP); Fumiyuki Moriya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 175 days.

(21) Appl. No.: 16/688,803

(22) Filed: Nov. 19, 2019

(65) Prior Publication Data

US 2020/0247266 A1    Aug. 6, 2020

(30) Foreign Application Priority Data

Feb. 5, 2019    (JP) .............................. JP2019-018965

(51) Int. Cl.
*B60L 58/12*    (2019.01)
*B60L 3/00*    (2019.01)
*B60L 50/61*    (2019.01)

(52) U.S. Cl.
CPC ............. *B60L 58/12* (2019.02); *B60L 3/0046* (2013.01); *B60L 3/0084* (2013.01); *B60L 50/61* (2019.02)

(58) Field of Classification Search
CPC ........ B60L 58/12; B60L 50/61; B60L 3/0046; B60L 3/0084
See application file for complete search history.

(56) References Cited

U.S. PATENT DOCUMENTS

2001/0049571 A1*  12/2001  Shimizu ................. B60L 50/16
                                                                701/22
2016/0089981 A1*   3/2016  Kodawara .............. B60L 50/40
                                                                307/10.1
(Continued)

FOREIGN PATENT DOCUMENTS

CN          104868447 A  *   8/2015
DE      112012003427 T5  *   5/2014  .............. B60L 50/16
(Continued)

*Primary Examiner* — James A Shriver, II
*Assistant Examiner* — Michael T. Walsh
(74) *Attorney, Agent, or Firm* — McGinn IP Law Group, PLLC

(57) ABSTRACT

An electric power supply system is to be included in a hybrid electric vehicle that is provided with a driving motor and an engine and is configured to switch between an HEV traveling mode of traveling by causing both the driving motor and the engine to operate and an EV traveling mode of stopping the engine and traveling with motive power of the driving motor. The electric power supply system includes a main battery, an electric power generator, a sub-battery, and a control apparatus. The main battery supplies electric power to the driving motor. The electric power generator generates electric power upon receiving motive power outputted from the engine. The sub-battery is charged with the electric power generated by the electric power generator. If an abnormality is diagnosed as being present in the sub-battery, the control apparatus disables the HEV traveling mode and enables the EV traveling mode.

19 Claims, 10 Drawing Sheets

(56) References Cited

U.S. PATENT DOCUMENTS

2016/0207520 A1* 7/2016 Mizushima ........... B60W 50/14
2017/0331400 A1* 11/2017 Saha ..................... H02P 6/12

FOREIGN PATENT DOCUMENTS

| JP | 2010242692 A | * | 10/2010 | ................ B60L 3/12 |
| JP | 2015159707 A | * | 9/2015 | ............. H02H 3/087 |
| JP | 2016-155439 A | | 9/2016 | |
| JP | 2018194477 A | * | 12/2018 | |

* cited by examiner

ELECTRIC POWER SUPPLY SYSTEM, METHOD OF CONTROLLING ELECTRIC POWER SUPPLY SYSTEM, AND CONTROL SYSTEM FOR HYBRID ELECTRIC VEHICLE

CROSS-REFERENCE TO RELATED APPLICATIONS

The present application claims priority from Japanese Patent Application No. 2019-018965 filed on Feb. 5, 2019, the entire contents of which are hereby incorporated by reference.

BACKGROUND

The technology relates to an electric power supply system, a method of controlling the electric power supply system, and a control system for a hybrid electric vehicle.

Hybrid electric vehicles that travel by using a driving motor and an engine as driving sources have already been in practical use. Such a hybrid electric vehicle includes an electric power supply system. For example, Japanese Unexamined Patent Application Publication No. 2016-155439 discloses an electric power supply system that includes a main battery and a sub-battery. The main battery is configured to store electric power to be supplied to a driving motor. The sub-battery is configured to store electric power to be supplied to various kinds of auxiliary machinery that are mounted on the vehicle.

SUMMARY

An aspect of the technology provides an electric power supply system for a hybrid electric vehicle. The hybrid electric vehicle is provided with a driving motor and an engine and is configured to switch a traveling mode between a hybrid electric vehicle (HEV) traveling mode and an electric vehicle (EV) traveling mode. The HEV traveling mode allows for traveling by causing both the driving motor and the engine to operate. The EV traveling mode allows for stopping the engine and traveling with motive power of the driving motor. The electric power supply system includes a main battery, an electric power generator, a sub-battery, and a control apparatus. The main battery is configured to supply electric power to the driving motor. The electric power generator is configured to generate electric power upon receiving motive power outputted from the engine. The sub-battery is configured to be charged with the electric power generated by the electric power generator. The control apparatus is coupleable to the driving motor and the engine. The control apparatus is configured to, if a predetermined abnormality is diagnosed as being present in the sub-battery, disable the HEV traveling mode, and enable the EV traveling mode as the traveling mode of the hybrid electric vehicle.

An aspect of the technology provides a control system for a hybrid electric vehicle that is provided with a driving motor and an engine. The control system is configured to switch a traveling mode between an HEV traveling mode and an EV traveling mode. The HEV traveling mode allows for traveling by causing both the driving motor and the engine to operate. The EV traveling mode allows for stopping the engine and traveling with motive power of the driving motor. The electric power supply system includes a main battery, an electric power generator, a sub-battery, and a control apparatus. The main battery is configured to supply electric power to the driving motor. The electric power generator is configured to generate electric power upon receiving motive power outputted from the engine. The sub-battery is configured to be charged with the electric power generated by the electric power generator. The control apparatus is coupleable to the driving motor and the engine. The control apparatus is configured to diagnose whether a predetermined abnormality is present in the sub-battery, select the traveling mode, between the HEV traveling mode and the EV traveling mode, depending on a requested driving force of the vehicle in a normal case where the abnormality is diagnosed as being absent in the sub-battery, and select the EV traveling mode regardless of the requested driving force in an abnormal case where the abnormality is diagnosed as being present in the sub-battery.

An aspect of the technology provides a method of controlling an electric power supply system for a hybrid electric vehicle. The hybrid electric vehicle is provided with a driving motor and an engine. The electric power supply system is provided with a main battery, an electric power generator, and a sub-battery. The main battery is configured to supply electric power to the driving motor. The electric power generator is configured to generate electric power upon receiving motive power outputted from the engine. The sub-battery is configured to be charged with the electric power generated by the electric power generator. The method includes diagnosing whether a predetermined abnormality is present in the sub-battery, enabling an HEV traveling mode in a normal case where the abnormality is diagnosed as being absent in the sub-battery, and disabling the HEV traveling mode and enabling an EV traveling mode in an abnormal case where the abnormality is diagnosed as being present in the sub-battery. The HEV traveling mode allows for traveling by causing both the driving motor and the engine to operate. The EV traveling mode allows for stopping the engine and traveling with motive power of the driving motor.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
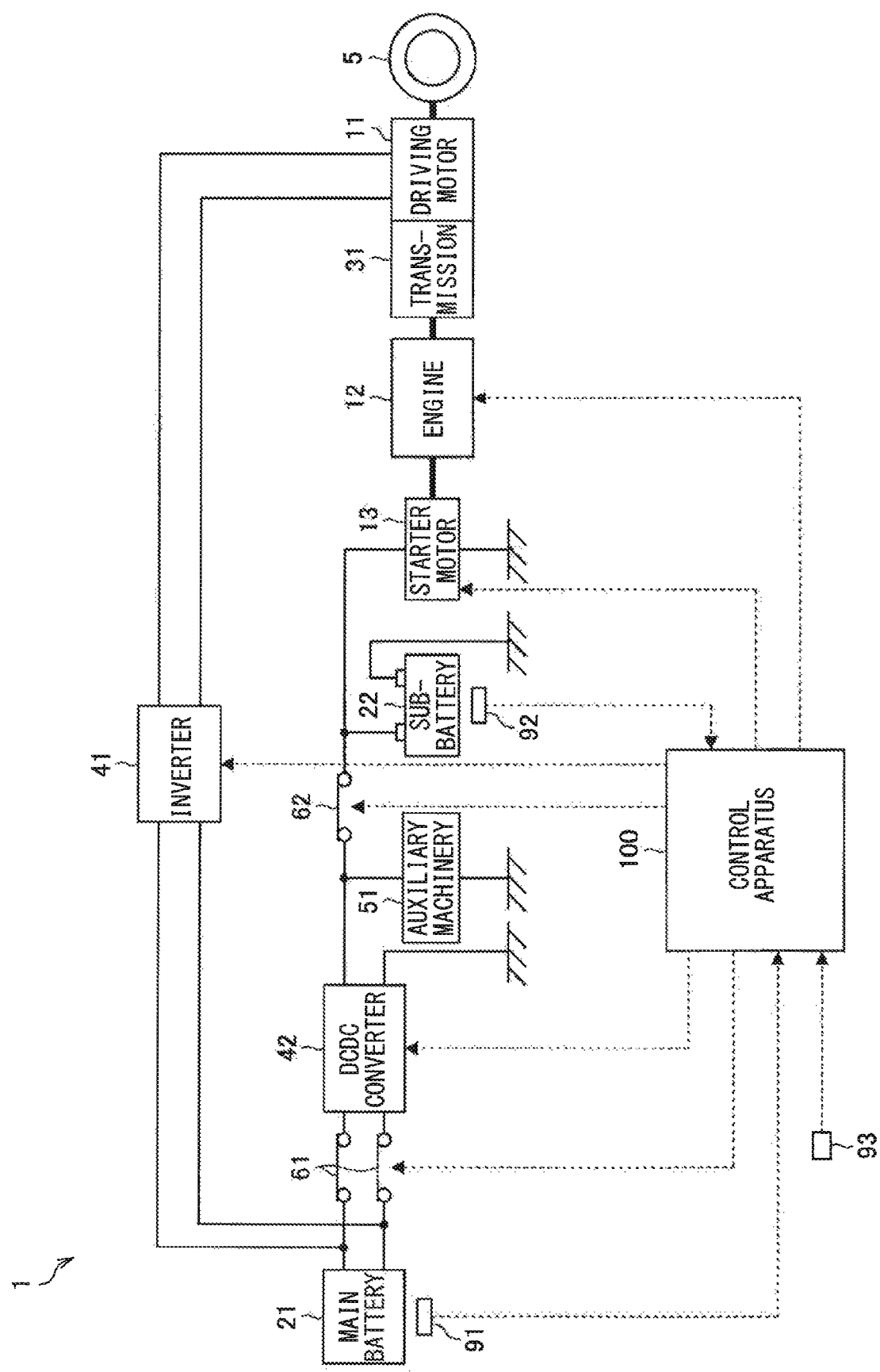
FIG. 1 is a schematic diagram illustrating an outline configuration of an electric power supply system according to one example embodiment of the technology.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

[1. Configuration of Electric Power Supply System]

First, with reference to FIGS. 1 to 4, description will be given on a configuration of an electric power supply system 1 according to one example embodiment of the technology. In one embodiment, the electric power supply system 1 may serve as a "control system for a hybrid electric vehicle".

Figure 2:
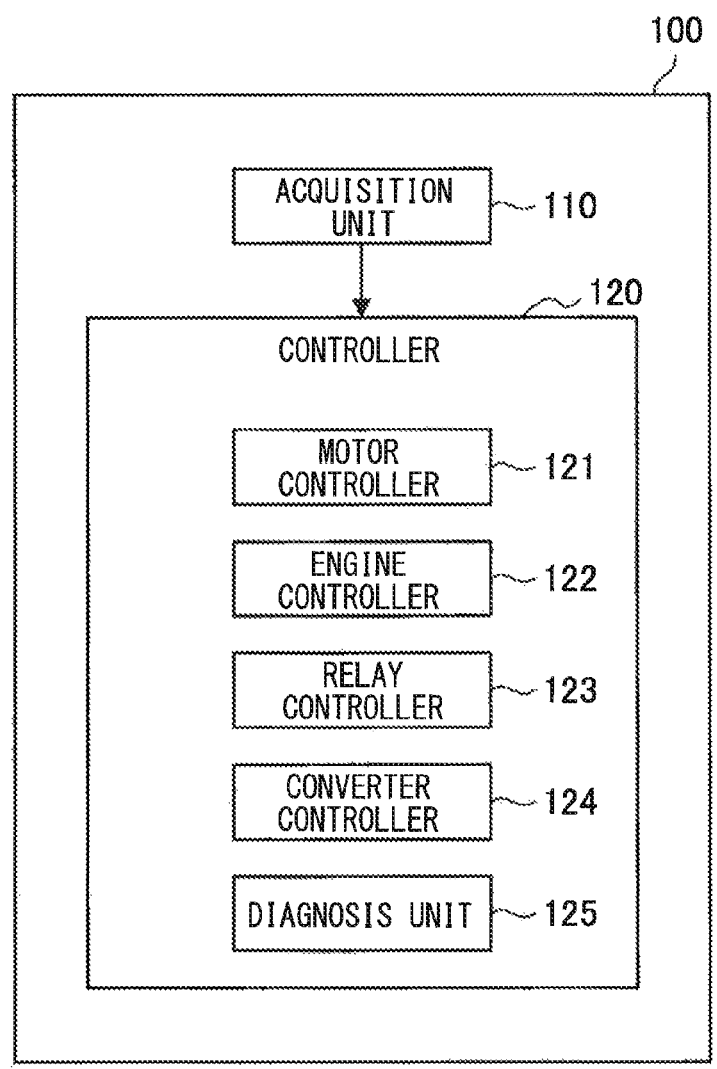
FIG. 2 is a block diagram illustrating an example of a configuration of a control apparatus according to the example embodiment.

FIG. 1 is a schematic diagram illustrating an outline configuration of the electric power supply system 1 according to the example embodiment. FIG. 2 is a block diagram illustrating an example of a configuration of a control apparatus 100 that is included in the electric power supply system 1.

In one example, the electric power supply system 1 is mounted on a hybrid electric vehicle, and may be used to supply electric power to each apparatus in the vehicle. The hybrid electric vehicle equipped with the electric power supply system 1 is able to switch between and execute an HEV traveling mode and an EV traveling mode, as will be described later. The HEV traveling mode allows for traveling using motive power of an engine 12 and a driving motor 11. The EV traveling mode allows for traveling using motive power of the driving motor 11 in a state in which the engine 12 is stopped. The HEV traveling mode may be a mode of traveling in a state in which the engine 12 is being driven and a starter motor 13 serving as an electric power generator is able to generate electric power.

It is to be noted that the electric power supply system 1 described below is a mere example of an electric power supply system according to an example embodiment of the technology. A configuration of an electric power supply system according to an example embodiment of the technology is not limited to the configuration of the electric power supply system 1, as will be described later.

As illustrated in FIG. 1, the electric power supply system 1 may include the driving motor 11, the engine 12, the starter motor 13, a main battery 21, a sub-battery 22, and the control apparatus 100. The electric power supply system 1 may further include a transmission 31, an inverter 41, a direct current-to-direct current (DCDC) converter 42, auxiliary machinery 51, system main relays 61, a diagnosis relay 62, a main battery sensor 91, a sub-battery sensor 92, and a speed sensor 93. The starter motor 13 is configured to generate electric power by using motive power outputted from the engine 12. In one embodiment, the starter motor 13 may serve as an "electric power generator".

The driving motor 11 may be able to output motive power to be used to drive a driving wheel 5 of the vehicle. As the driving motor 11, a polyphase alternating current (e.g., three-phase alternating current) motor may be used, for example. The driving motor 11 may be coupled to the main battery 21 via the inverter 41, and may generate the motive power by using electric power supplied from the main battery 21 via the inverter 41. At this occasion, direct current electric power discharged from the main battery 21 may be converted to alternating current electric power by the inverter 41 to be supplied to the driving motor 11.

The driving motor 11 may also be configured to generate electric power by using rotational energy of the driving wheel 5 when the vehicle decelerates. This operation may also be referred to as a regenerative operation. At this occasion, alternating current electric power generated by the driving motor 11 may be converted to direct current electric power by the inverter 41 to be supplied to the main battery 21. Thus, the main battery 21 may be charged with the electric power generated by the driving motor 11.

The engine 12 may be an internal combustion engine that generates motive power by using gasoline, for example, as fuel, and may be able to output motive power to be used to drive the driving wheel 5 of the vehicle. A crankshaft serving as an output shaft of the engine 12 may be coupled to the transmission 31 via a torque converter or a clutch, for example, that is not illustrated. As the transmission 31, it is possible to use a transmission having any of various continuously variable transmission mechanisms, such as a belt transmission mechanism or a chain transmission mechanism, for example. The motive power outputted from the engine 12 may be changed in speed by the transmission 31 to be transmitted to the driving wheel 5. It is to be noted that the driving motor 11 described above may be coupled to the driving wheel 5 via the transmission 31, or may be coupled to the driving wheel 5 without the transmission 31 being interposed therebetween.

The starter motor 13 may be configured to perform cranking in starting the engine 12. An output shaft of the starter motor 13 may be coupled to the crankshaft of the engine 12 via a gear, and motive power outputted from the starter motor 13 may be transmitted to the crankshaft of the engine 12. The starter motor 13 may be coupled to the sub-battery 22, and may generate motive power for cranking by using electric power supplied from the sub-battery 22.

As the starter motor 13, a direct current motor or an alternating current motor may be used, for example. In a case where an alternating current motor is used as the starter motor 13, the starter motor 13 may be coupled to the sub-battery 22 via an inverter that is not illustrated, direct current electric power discharged from the sub-battery 22 may be converted to alternating current electric power by the inverter to be supplied to the starter motor 13.

The starter motor 13 is also able to generate electric power by using the motive power outputted from the engine 12. The electric power generated by the starter motor 13 may be supplied to the sub-battery 22. Thus, the sub-battery 22 may be charged with the electric power generated by the starter motor 13. In one example, the above-described charging of the sub-battery 22 using the motive power outputted from the engine 12 may be performed in the HEV traveling mode, as will be described later.

The main battery 21 is configured to store electric power to be supplied to the driving motor 11. In one example, the main battery 21 may be a battery with a voltage (e.g., 100 V) higher than that of the sub-battery 22. As the main battery 21, a secondary battery such as a lithium ion battery or a nickel-metal hydride battery may be used, for example.

In one example, the main battery 21 may be coupled to equipment (e.g., the auxiliary machinery 51, the sub-battery 22, and the starter motor 13) in the vehicle via the DCDC converter 42, as will be described later. The DCDC converter 42 may be able to step down an output voltage of the main battery 21 and output the stepped-down voltage. The electric power stored in the main battery 21 may be able to be stepped down by the DCDC converter 42 to be supplied to the equipment. Here, the system main relays 61 may be provided between the main battery 21 and the DCDC converter 42. The system main relays 61 may be able to allow or cut off electrical connection between the main battery 21 and the DCDC converter 42 on both the positive electrode side and the negative electrode side. The system main relays 61 may be in an open state when the electric power supply system 1 is stopped, and may be in a closed state after the electric power supply system 1 is activated (i.e., while the electric power supply system 1 is in operation).

The sub-battery 22 may be configured to mainly store electric power to be supplied to the auxiliary machinery 51. The sub-battery 22 is able to be charged with the electric power generated by the starter motor 13, as described above. In one example, the sub-battery 22 may be a battery with a voltage (e.g., 12 V) lower than that of the main battery 21, and may be coupled to the main battery 21 via the DCDC converter 42. As the sub-battery 22, a secondary battery such as a lead-acid battery or a lithium ion battery may be used, for example.

In one example, the sub-battery 22 may be coupled to the auxiliary machinery 51, and the electric power stored in the sub-battery 22 may basically be supplied to the auxiliary machinery 51. The auxiliary machinery 51 may include, for example, various kinds of equipment such as air conditioning equipment or acoustic equipment in the vehicle. Here, the sub-battery 22 may be coupled to the auxiliary machinery 51 via the diagnosis relay 62. The diagnosis relay 62 may be a switch that is able to allow or cut off electrical connection of the sub-battery 22 and the starter motor 13 to the auxiliary machinery 51 and the main battery 21. The diagnosis relay 62 may be provided to execute abnormality diagnosis of the sub-battery 22, which will be described later. The diagnosis relay 62 may be in an open state when the abnormality diagnosis of the sub-battery 22 is being executed, and may basically be in a closed state when the abnormality diagnosis is not being executed.

The main battery sensor 91 may detect various quantities of state of the main battery 21, and output the detected quantities of state to the control apparatus 100. In one example, the main battery sensor 91 may detect a remaining capacity of the main battery 21. Hereinafter, the remaining capacity may also be referred to as a state of charge (SOC).

The sub-battery sensor 92 may detect various quantities of state of the sub-battery 22, and output the detected quantities of state to the control apparatus 100. In one example, the sub-battery sensor 92 may detect voltage and internal resistance of the sub-battery 22.

The speed sensor 93 may detect a vehicle speed that is a speed of the vehicle, and output the detected vehicle speed to the control apparatus 100.

The control apparatus 100 may include a central processing unit (CPU), a read only memory (ROM), and a random access memory (RAM), for example. The CPU may be an arithmetic processing unit. The ROM may be a storage device that stores information such as programs and operation parameters to be used by the CPU. The RAM may be a storage device that temporarily stores parameters, for example, that change as appropriate in execution of the CPU.

The control apparatus 100 may communicate with each apparatus mounted on the electric power supply system 1. The control apparatus 100 may communicate with each apparatus by, for example, controller area network (CAN) communication.

It is to be noted that operations of the control apparatus 100 according to the example embodiment may at least partially be shared by a plurality of control apparatuses, or a plurality of operations may be implemented by one control apparatus. For example, the operations of the control apparatus 100, including controlling the operation of the driving motor 11, controlling the operation of the engine 12, and other operations, may be shared by different control apparatuses. In a case where the operations of the control apparatus 100 are at least partially shared by a plurality of control apparatuses, the plurality of control apparatuses may be coupled to each other via a communication bus of CAN, for example.

For example, the control apparatus 100 may include an acquisition unit 110 and a controller 120, as illustrated in FIG. 2.

The acquisition unit 110 may acquire various kinds of information to be used in a process performed by the controller 120. The acquisition unit 110 may output the acquired information to the controller 120. For example, the acquisition unit 110 may communicate with the sensors, i.e., the main battery sensor 91, the sub-battery sensor 92, and the speed sensor 93, to acquire various kinds of information outputted from the respective sensors.

The controller 120 may control operation of each apparatus of the electric power supply system 1. For example, the controller 120 may include a motor controller 121, an engine controller 122, a relay controller 123, a converter controller 124, and a diagnosis unit 125.

The motor controller 121 may control operation of the driving motor 11. In one example, the motor controller 121 may control operation of a switching device of the inverter 41 to control electric power supply between the driving motor 11 and the main battery 21. This allows the motor controller 121 to control motive power generation and electric power generation that are performed by the driving motor 11.

The engine controller 122 may control operation of the engine 12. In one example, the engine controller 122 may control operation of each unit in the engine 12 to control a throttle position, ignition timing, and a fuel injection quantity, for example. This allows the engine controller 122 to control output of the engine 12.

The engine controller 122 may also control operation of the starter motor 13. In one example, the engine controller 122 may control electric power supply between the starter motor 13 and the sub-battery 22. This allows the engine controller 122 to control start of the engine 12 and electric power generation that are performed by the starter motor 13, the electric power generation using the motive power outputted from the engine 12.

The relay controller 123 may control operation of the system main relays 61 and the diagnosis relay 62. In one example, the relay controller 123 may control operation of a driving unit (not illustrated) that drives the system main relays 61 and a driving unit (not illustrated) that drives the diagnosis relay 62. This allows the relay controller 123 to control opening/closing operation of each of the system main relays 61 and the diagnosis relay 62.

For example, when the electric power supply system 1 is stopped, i.e., when an ignition switch is READY-OFF, the relay controller 123 may keep the system main relays 61 in the open state. When the vehicle makes a start, a driver may perform an operation using the ignition switch to cause an engine start request (i.e., a request for start of the engine 12). When the engine start request occurs, the relay controller 123 may close the system main relays 61 to activate the electric power supply system 1.

In addition, when the abnormality diagnosis of the sub-battery 22 is being executed, the relay controller 123 may keep the diagnosis relay 62 in the open state. When the abnormality diagnosis of the sub-battery 22 is not being executed, the relay controller 123 may basically keep the diagnosis relay 62 in the closed state.

The converter controller 124 may control operation of the DCDC converter 42. In one example, the converter controller 124 may control operation of a switching device of the DCDC converter 42 to control electric power supply between the main battery 21 and the auxiliary machinery 51, the sub-battery 22, and the starter motor 13.

The diagnosis unit 125 may diagnose presence or absence of an abnormality in the sub-battery 22. For example, the diagnosis unit 125 may determine, as the presence or absence of an abnormality in the sub-battery 22, whether a short-circuit has occurred in the sub-battery 22. The short-circuit refers to a state in which a short-circuit has occurred in a cell included in the sub-battery 22. In another example, the diagnosis unit 125 may determine, as the presence or absence of an abnormality in the sub-battery 22, whether deterioration has occurred in the sub-battery 22. The deterioration refers to a state in which chemical or physical deterioration of an electrode has occurred in a cell included in the sub-battery 22.

Controlling the operation of the driving motor 11 and the engine 12 as described above allows the controller 120 to switch between the HEV traveling mode and the EV traveling mode as the traveling modes of the vehicle.

For example, the controller 120 may basically switch the traveling mode of the vehicle on the basis of a requested driving force that is a requested value of motive power to be transmitted to the driving wheel 5. In one example, in a case where the requested driving force is greater than a reference driving force, the controller 120 may switch the traveling mode of the vehicle to the HEV traveling mode. In a case where the requested driving force is equal to or less than the reference driving force, the controller 120 may switch the traveling mode of the vehicle to the EV traveling mode. The reference driving force may be set to a value that is smaller than a maximum value of motive power transmittable from the driving motor 11 to the driving wheel 5. For example, in terms of improving electric mileage, the reference driving force may be set depending on specifications, for example, of the driving motor 11. It is to be noted that the controller 120 is able to calculate the requested driving force on the basis of an accelerator position and the vehicle speed, for example.

Figure 3:
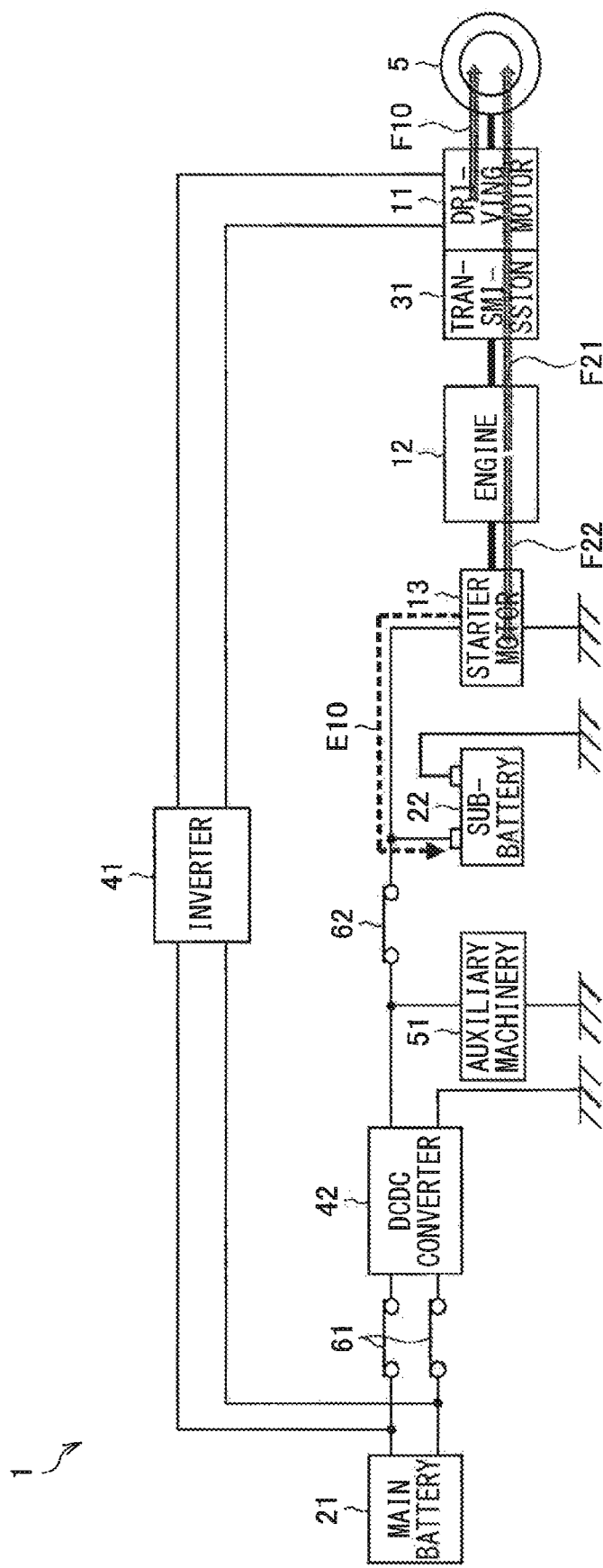
FIG. 3 is a schematic diagram illustrating a motive power transmission state during an HEV traveling mode in the electric power supply system according to the example embodiment.

FIG. 3 is a schematic diagram illustrating a motive power transmission state during the HEV traveling mode in the electric power supply system 1.

In the HEV traveling mode, the motor controller 121 and the engine controller 122 of the controller 120 may respectively control output of the driving motor 11 and the engine 12, in cooperation with each other, to cause the motive power transmitted to the driving wheel 5 to be the requested driving force. Thus, as illustrated in FIG. 3, motive power F10 outputted from the driving motor 11 may be transmitted to the driving wheel 5, and motive power F21 outputted from the engine 12 may be transmitted to the driving wheel 5 via the transmission 31. In this manner, in the HEV traveling mode, the vehicle may travel using the motive power of the engine 12 and the driving motor 11.

Here, in the HEV traveling mode, motive power F22 outputted from the engine 12 may be transmitted to the starter motor 13. Thus, the starter motor 13 may generate electric power, and electric power E10 generated by the starter motor 13 may be supplied to the sub-battery 22 to charge the sub-battery 22. In this manner, in the HEV traveling mode, the vehicle may travel in a state in which the engine 12 is being driven and the starter motor 13 serving as an electric power generator is able to generate electric power.

In the HEV traveling mode, in a case where a predetermined condition is satisfied, e.g., in a case where the SOC of the main battery 21 is equal to or greater than a reference value, the main battery 21 may be caused to supply electric power to the sub-battery 22 via the DCDC converter 42 to charge the sub-battery 22.

Figure 4:
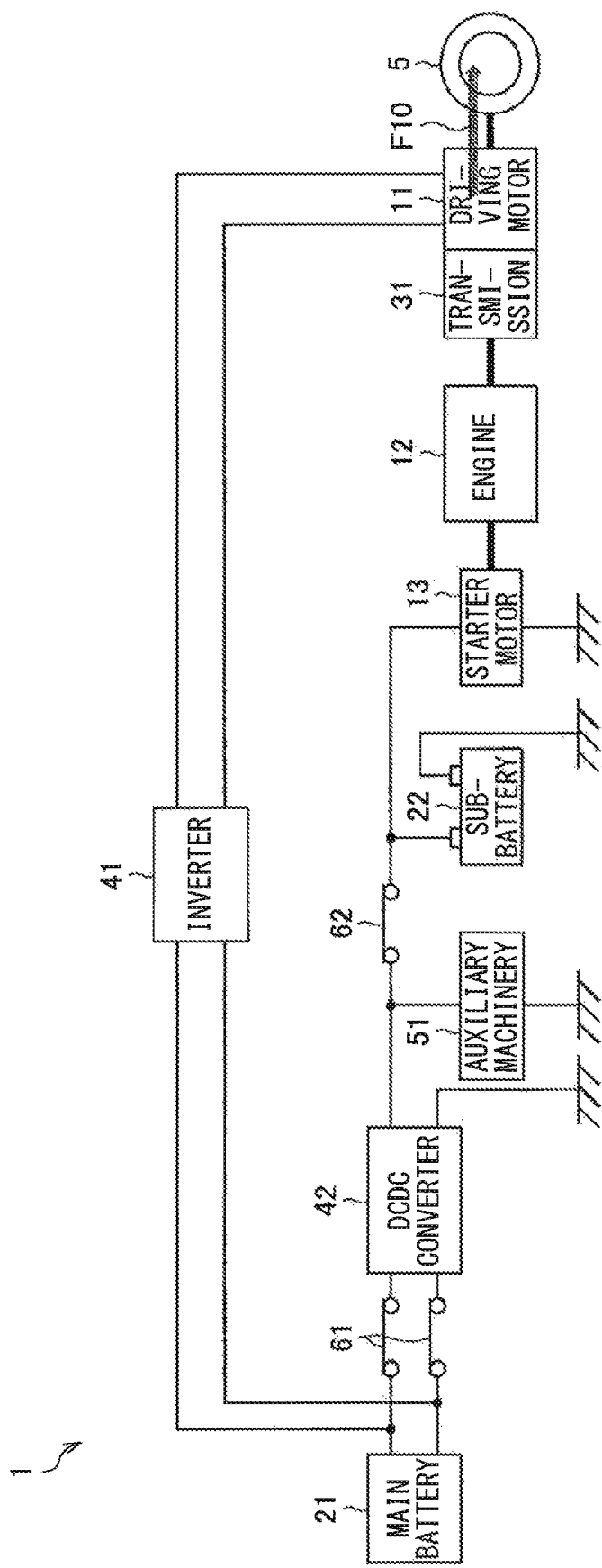
FIG. 4 is a schematic diagram illustrating a motive power transmission state during an EV traveling mode in the electric power supply system according to the example embodiment.

FIG. 4 is a schematic diagram illustrating a motive power transmission state during the EV traveling mode in the electric power supply system 1.

In the EV traveling mode, the engine controller 122 of the controller 120 may stop the engine 12, and the motor controller 121 may control output of the driving motor 11 to cause the motive power transmitted to the driving wheel 5 to be the requested driving force. Thus, as illustrated in FIG. 4, only the motive power F10 outputted from the driving motor 11 may be transmitted to the driving wheel 5. In this manner, in the EV traveling mode, the vehicle may travel using the motive power of the driving motor 11 in a state in which the engine 12 is stopped.

Here, in the EV traveling mode, a clutch (not illustrated) that allows or cuts off motive power transmission between the engine 12 and the driving motor 11 may be opened, for example, bringing about a state in which no motive power is transmitted to the starter motor 13. This stops electric power generation by the starter motor 13, bringing about a state in which at least charging of the sub-battery 22 using the motive power outputted from the engine 12 is not performed.

In the control apparatus 100 according to the example embodiment, if the sub-battery 22 is diagnosed as being abnormal, the controller 120 disables the HEV traveling mode and enables the EV traveling mode. This makes it possible to cause the vehicle to keep traveling while protecting the sub-battery 22 when the sub-battery 22 is abnormal. Such a process that is performed by the controller 120 and is related to switching of the traveling mode when the sub-battery 22 is abnormal will be described in detail later.

[2. Operation of Electric Power Supply System]

Now, with reference to FIGS. 5 to 7, description will be given on operation of the electric power supply system 1 according to the example embodiment of the technology. The following description describes a first example, a second example, and a third example in this order, as examples of a flow of a process that is performed by the control apparatus 100 of the electric power supply system 1.

[2-1. First Example]

First, with reference to FIG. 5, the first example of the flow of the process performed by the control apparatus 100 will be described.

Figure 5:
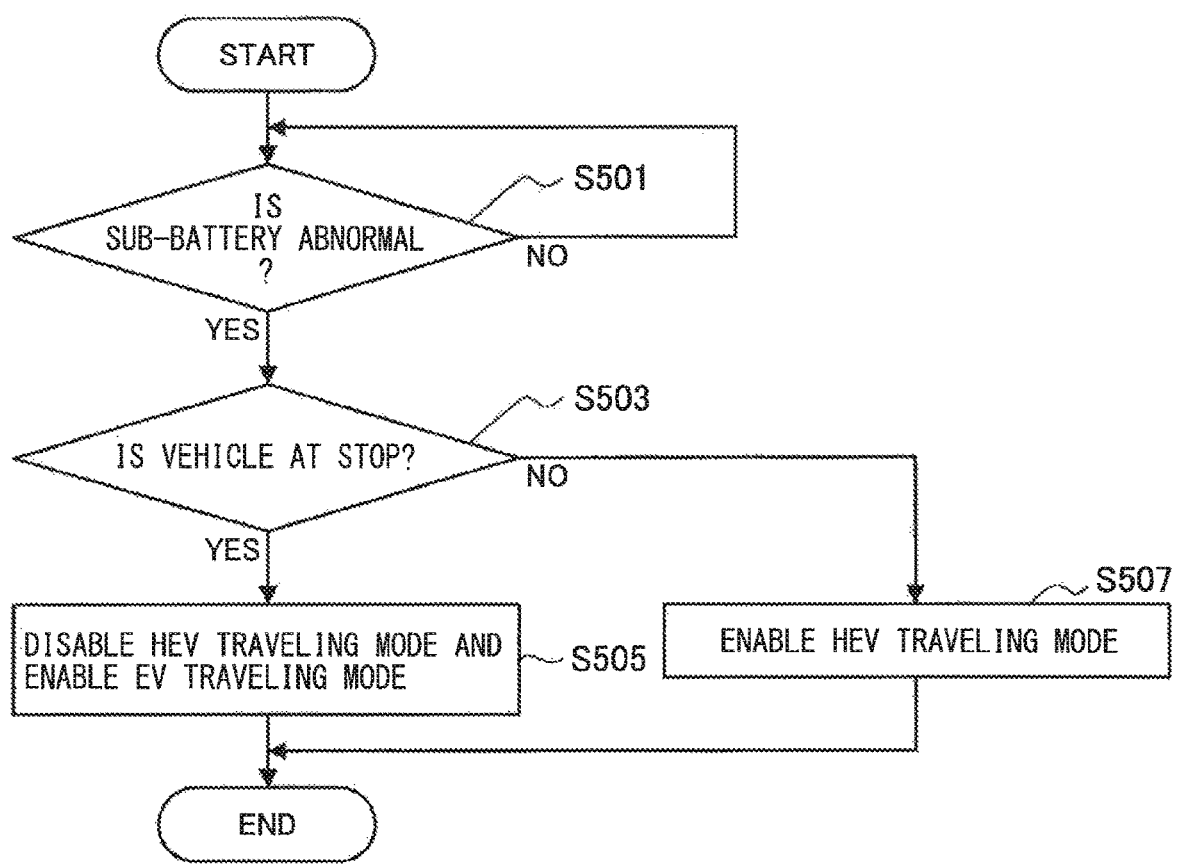
FIG. 5 is a flowchart illustrating a first example of a flow of a process that is performed by the control apparatus according to the example embodiment.

FIG. 5 is a flowchart illustrating the first example of the flow of the process performed by the control apparatus 100. In one example, a control flow according to the first example illustrated in FIG. 5 may be a flow of a process that is performed by the controller 120 of the control apparatus 100 and is related to switching of the traveling mode when the sub-battery 22 is abnormal. For example, the control apparatus 100 may be programmed to cause the controller 120 to execute the control related to the first example, at predetermined operation time intervals, after the electric power supply system 1 is activated.

When the control flow according to the first example illustrated in FIG. 5 is started, first, the controller 120 may diagnose whether the sub-battery 22 is abnormal in step S501. In a case where the sub-battery 22 is diagnosed as being abnormal (step S501/YES), the control flow may proceed to step S503. In a case where the sub-battery 22 is diagnosed as being normal (step S501/NO), the process in step S501 may be repeated.

As described above, the presence or absence of an abnormality in the sub-battery 22 may be diagnosed by the diagnosis unit 125. The diagnosis unit 125 may diagnose, as the presence or absence of an abnormality in the sub-battery 22, whether a short-circuit has occurred in the sub-battery 22 or whether deterioration has occurred in the sub-battery 22, for example.

For example, the diagnosis unit 125 may diagnose whether a short-circuit has occurred in the sub-battery 22, on the basis of open-circuit voltage of the sub-battery 22. In one example, the diagnosis unit 125 may diagnose that the sub-battery 22 is short-circuited in a case where the open-circuit voltage of the sub-battery 22 is determined to be less than a voltage threshold. The diagnosis unit 125 may diagnose that the sub-battery 22 is not short-circuited in a case where the open-circuit voltage of the sub-battery 22 is determined to be equal to or greater than the voltage threshold.

In a case where the sub-battery 22 is short-circuited, the open-circuit voltage of the sub-battery 22 may be lower than that in a normal case. Therefore, comparing the open-circuit voltage of the sub-battery 22 with the voltage threshold as described above makes it possible to appropriately diagnose whether a short-circuit has occurred in the sub-battery 22. The voltage threshold may be set, for example, to a value that is higher than the open-circuit voltage of the sub-battery 22 assumed in a case where one cell of the sub-battery 22 is short-circuited and is lower than the open-circuit voltage of the sub-battery 22 in a normal case.

In another example, the diagnosis unit 125 may diagnose whether deterioration has occurred in the sub-battery 22, on the basis of the internal resistance of the sub-battery 22. For example, the diagnosis unit 125 may diagnose that the sub-battery 22 has deteriorated in a case where the internal resistance of the sub-battery 22 is determined to be greater than a resistance threshold. The diagnosis unit 125 may diagnose that the sub-battery 22 has not deteriorated in a case where the internal resistance of the sub-battery 22 is determined to be equal to or less than the resistance threshold.

In a case where deterioration has occurred in the sub-battery 22, the internal resistance of the sub-battery 22 may be larger than that in a normal case. Therefore, comparing the internal resistance of the sub-battery 22 with the resistance threshold as described above makes it possible to appropriately diagnose whether deterioration has occurred in the sub-battery 22. The resistance threshold may be set, for example, to a value that is smaller than the internal resistance of the sub-battery 22 assumed in a case where deterioration has occurred in one cell of the sub-battery 22 and is larger than the internal resistance of the sub-battery 22 in a normal case.

Here, in terms of appropriately diagnosing the presence or absence of an abnormality in the sub-battery 22, for example, the presence or absence of an abnormality in the sub-battery 22 may be diagnosed in a state in which the diagnosis relay 62 is open. In a case where the diagnosis relay 62 is open, electrical connection of the sub-battery 22 and the starter motor 13 to the auxiliary machinery 51 and the main battery 21 may be in a cut-off state. This stops electric power supply from the sub-battery 22 to the auxiliary machinery 51 and electric power supply from the main battery 21 to the sub-battery 22, bringing about a state in which no current is flowing in the sub-battery 22. This allows the sub-battery sensor 92 to detect appropriate values as electrical quantities of state (e.g., voltage and internal resistance) of the sub-battery 22 as compared with a state in which a current is flowing in the sub-battery 22. Thus, it is possible to detect more appropriate values as the electrical quantities of state of the sub-battery 22 to be used in diagnosing the presence or absence of an abnormality in the sub-battery 22. This makes it possible to appropriately diagnose the presence or absence of an abnormality in the sub-battery 22.

In some cases, it can be difficult to open the diagnosis relay 62, or the diagnosis relay 62 may be omitted from the configuration of the electric power supply system 1. In such cases, for example, the presence or absence of an abnormality in the sub-battery 22 may be diagnosed in a state in which currents inputted and outputted to/from the sub-battery 22 fall within a predetermined range. In one example, the predetermined range may be set to a range that allows appropriate determination of whether currents inputted and outputted to/from the sub-battery 22 have a relatively small influence on values detected as the electrical quantities of state of the sub-battery 22.

In a case where the determination result is YES in step S501, the controller 120 may determine whether the vehicle is at a stop in step S503. In a case where the vehicle is determined to be at a stop (step S503/YES), the control flow may proceed to step S505. In a case where the vehicle is determined to be traveling (step S503/NO), the control flow may proceed to step S507.

For example, the controller 120 is able to determine whether the vehicle is at a stop by using a value detected by the speed sensor 93.

In a case where the determination result is YES in step S503, the controller 120 may disable the HEV traveling mode and enable the EV traveling mode in step S505.

In one example, in a case where the traveling mode is the HEV traveling mode when the determination YES is made in step S503, in step S505, the controller 120 may switch the traveling mode from the HEV traveling mode to the EV traveling mode, and thereafter disable switching of the traveling mode to the HEV traveling mode.

In a case where the determination result is NO in step S503, the controller 120 may enable the HEV traveling mode in step S507.

In one example, in a case where the traveling mode is the HEV traveling mode when the determination NO is made in step S503, in step S507, the controller 120 may keep the traveling mode at the HEV traveling mode, without switching the traveling mode from the HEV traveling mode to the EV traveling mode.

After step S505 or step S507, the control flow illustrated in FIG. 5 may end.

As described above, if the sub-battery 22 is diagnosed as being abnormal, the controller 120 may disable the HEV traveling mode and enable the EV traveling mode. For example, in the first example described with reference to FIG. 5, if the sub-battery 22 is diagnosed as being abnormal, the controller 120 may disable the HEV traveling mode and enable the EV traveling mode in a case where the vehicle is at a stop.

In the HEV traveling mode, the sub-battery 22 may be charged by using the motive power outputted from the engine 12, as described above. In the EV traveling mode, the engine 12 may be in a stopped state, unlike in the HEV traveling mode. Therefore, it is possible to stop the charging of the sub-battery 22 using the motive power outputted from the engine 12, by switching the traveling mode from the HEV traveling mode to the EV traveling mode by disabling the HEV traveling mode and enabling the EV traveling mode. Accordingly, if the sub-battery 22 is diagnosed as being abnormal, disabling the HEV traveling mode and enabling the EV traveling mode makes it possible to inhibit the sub-battery 22 with the abnormality from being overcharged, while avoiding the vehicle from becoming unable to travel. This makes it possible to cause the vehicle to keep traveling while protecting the sub-battery 22 when the sub-battery 22 is abnormal.

In the first example described with reference to FIG. 5, if the sub-battery 22 is diagnosed as being abnormal, the controller 120 may enable the HEV traveling mode in a case where the vehicle is traveling.

Here, in the EV traveling mode, the engine 12 may be in the stopped state, unlike in the HEV traveling mode; thus, a maximum value of driving force transmittable to the driving wheel 5 may be lower than that in the HEV traveling mode. Therefore, in a case where the traveling mode is switched from the HEV traveling mode to the EV traveling mode while the vehicle is traveling, the vehicle speed may decrease with a decrease in driving force transmitted to the driving wheel 5. Accordingly, it is possible to inhibit the vehicle speed from decreasing while the vehicle is traveling, by avoiding the traveling mode from being switched from the HEV traveling mode to the EV traveling mode during traveling by enabling the HEV traveling mode in a case where the vehicle is traveling. This makes it possible to inhibit the vehicle from being run into by a subsequent vehicle due to a decrease in vehicle speed during traveling. On the other hand, while the vehicle is at a stop, the possibility of being run into by a subsequent vehicle is unlikely to increase even if the traveling mode is switched from the HEV traveling mode to the EV traveling mode. Accordingly, it is possible to improve safety, while protecting the sub-battery 22 and allowing the vehicle to keep traveling when the sub-battery 22 is abnormal.

It is to be noted that the control flow illustrated in FIG. 5 may be executed repeatedly in a case where the control flow proceeds to step S507 and ends with the HEV traveling mode enabled. For example, even if the vehicle is traveling at a point in time when an abnormality has occurred in the sub-battery 22, the vehicle thereafter making a stop may trigger the controller 120 to disable the HEV traveling mode and enable the EV traveling mode.

[2-2. Second Example]

Now, with reference to FIG. 6, the second example of the flow of the process performed by the control apparatus 100 will be described.

Figure 6:
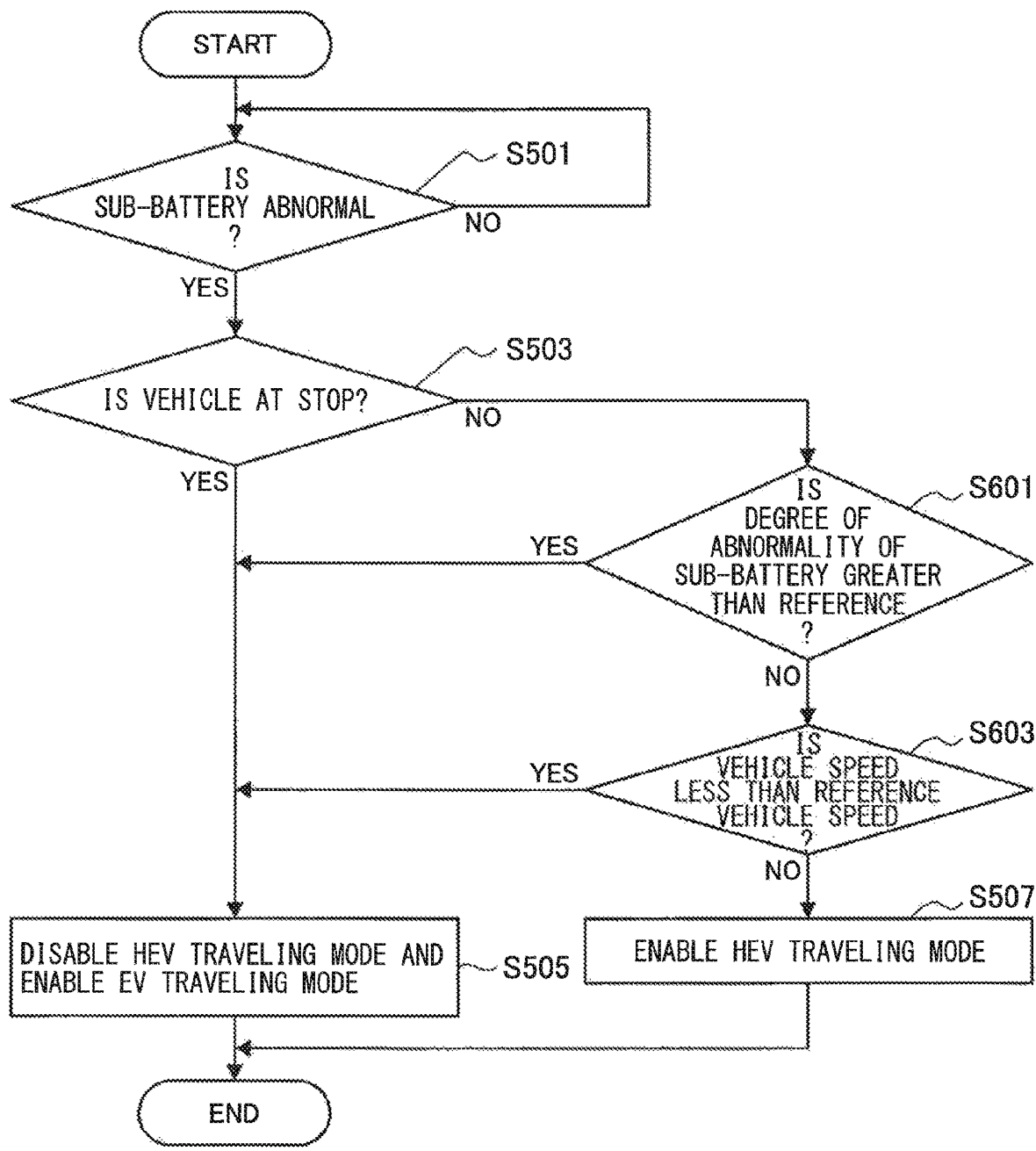
FIG. 6 is a flowchart illustrating a second example of a flow of a process that is performed by the control apparatus according to the example embodiment.

FIG. 6 is a flowchart illustrating the second example of the flow of the process performed by the control apparatus 100. In one example, like the control flow according to the first example illustrated in FIG. 5, a control flow according to the second example illustrated in FIG. 6 may be a flow of a process that is performed by the controller 120 of the control apparatus 100 and is related to switching of the traveling mode when the sub-battery 22 is abnormal. For example, as with the control related to the first example, the control apparatus 100 may be programmed to cause the controller 120 to execute the control related to the second example, at predetermined operation time intervals, after the electric power supply system 1 is activated.

The second example may differ from the first example described with reference to FIG. 5 in that the second example additionally includes processes that are directed to disabling the HEV traveling mode, regardless of the determination result of the determination process in step S503, in a case where a specific condition is satisfied. In one example, the processes may be step S601 and step S603.

In a case where the determination result is YES in step S503, the control flow according to the second example illustrated in FIG. 6 may proceed to step S505, like the control flow according to the first example illustrated in FIG. 5. In a case where the determination result is NO in step S503, the control flow according to the second example may proceed to step S601, unlike the control flow according to the first example illustrated in FIG. 5.

In a case where the determination result is NO in step S503, the controller 120 may determine whether a degree of abnormality of the sub-battery 22 is greater than a reference in step S601. In a case where the degree of abnormality of the sub-battery 22 is determined to be greater than the reference (step S601/YES), the control flow may proceed to step S505. In a case where the degree of abnormality of the sub-battery 22 is determined not to be greater than the reference (step S601/NO), the control flow may proceed to step S603.

The degree of abnormality of the sub-battery 22 being greater than the reference indicates excessively high possibility of the sub-battery 22 being damaged by electric power supply to the sub-battery 22.

For example, if the sub-battery 22 is diagnosed as being short-circuited in the presence or absence diagnosis of an abnormality in the sub-battery 22 in step S501, the controller 120 may determine that the degree of abnormality of the sub-battery 22 is greater than the reference in a case where the open-circuit voltage of the sub-battery 22 is determined to be less than a reference voltage. The reference voltage may be smaller than the voltage threshold. The reference voltage may be set as appropriate depending on specifications, for example, of the sub-battery 22.

In another example, if the sub-battery 22 is diagnosed as having deteriorated in the presence or absence diagnosis of an abnormality in the sub-battery 22 in step S501, the controller 120 may determine that the degree of abnormality of the sub-battery 22 is greater than the reference in a case where the internal resistance of the sub-battery 22 is determined to be greater than a reference resistance. The reference resistance may be larger than the resistance threshold. The reference resistance may be set as appropriate depending on specifications, for example, of the sub-battery 22.

In a case where the determination result is NO in step S601, the controller 120 may determine whether the vehicle speed is less than a reference vehicle speed in step S603. In a case where the vehicle speed is determined to be less than the reference vehicle speed (step S603/YES), the control flow may proceed to step S505. In a case where the vehicle speed is determined to be equal to or greater than the reference vehicle speed (step S603/NO), the control flow may proceed to step S507.

The reference vehicle speed may be set to a value that allows appropriate determination of whether the possibility of being run into by a subsequent vehicle due to a decrease in vehicle speed is sufficiently low. The decrease in vehicle speed can be caused by the traveling mode being switched from the HEV traveling mode to the EV traveling mode while the vehicle is traveling. In other words, the vehicle speed being determined to be less than the reference vehicle speed indicates that, though the vehicle is traveling, the possibility of being run into by a subsequent vehicle due to a decrease in vehicle speed is sufficiently low. The decrease in vehicle speed can be caused by the traveling mode being switched from the HEV traveling mode to the EV traveling mode.

In the second example, the control flow may proceed to step S505 in a case where the determination result is YES in step S601 or a case where the determination result is YES in step S603, in addition to a case where the determination result is YES in step S503. In step S505, the controller 120 may disable the HEV traveling mode and enable the EV traveling mode. In a case where the determination result is NO in step S603, the controller 120 may enable the HEV traveling mode in step S507.

After step S505 or step S507, the control flow illustrated in FIG. 6 may end. As described above, in the second example described with reference to FIG. 6, if the sub-battery 22 is diagnosed as being abnormal, the controller 120 may disable the HEV traveling mode and enable the EV traveling mode, regardless of a traveling state of the vehicle, in a case where the degree of abnormality of the sub-battery 22 is greater than the reference. Thus, in a case where the possibility of the sub-battery 22 being damaged by electric power supply to the sub-battery 22 is excessively high, it is possible to switch the traveling mode from the HEV traveling mode to the EV traveling mode, making it possible to stop the charging of the sub-battery 22 using the motive power outputted from the engine 12. This makes it possible to protect the sub-battery 22 more appropriately when the sub-battery 22 is abnormal.

In addition, in the second example described with reference to FIG. 6, if the sub-battery 22 is diagnosed as being abnormal, the controller 120 may disable the HEV traveling mode and enable the EV traveling mode in a case where the vehicle is traveling and the vehicle speed of the vehicle is less than the reference speed. A decrease in vehicle speed can be caused by the traveling mode being switched from the HEV traveling mode to the EV traveling mode. In a case where, though the vehicle is traveling, the possibility of being run into by a subsequent vehicle due to the decrease in vehicle speed is sufficiently low, it is possible to switch the traveling mode from the HEV traveling mode to the EV traveling mode. This makes it possible to stop the charging of the sub-battery 22 using the motive power outputted from the engine 12. Therefore, it is possible to inhibit the HEV traveling mode from being unnecessarily enabled when the sub-battery 22 is abnormal, which makes it possible to protect the sub-battery 22 more appropriately.

It is to be noted that the control flow illustrated in FIG. 6 may be executed repeatedly in a case where the control flow proceeds to step S507 and ends with the HEV traveling mode enabled. For example, even in a case where the degree of abnormality of the sub-battery 22 is not greater than the reference at a point in time when an abnormality has occurred in the sub-battery 22, the degree of abnormality of the sub-battery 22 thereafter exceeding the reference may trigger the controller 120 to disable the HEV traveling mode and enable the EV traveling mode. In another example, even in a case where the vehicle speed is equal to or greater than the reference vehicle speed at a point in time when an abnormality has occurred in the sub-battery 22, the vehicle speed thereafter falling below the reference vehicle speed may trigger the controller 120 to disable the HEV traveling mode and enable the EV traveling mode.

In the control flow illustrated in FIG. 6, it may be determined whether the degree of abnormality of the sub-battery 22 is greater than the reference (step S601) in a case where the vehicle is determined to be traveling (step S503/NO). Alternatively, it may be determined whether the degree of abnormality of the sub-battery 22 is greater than the reference in a case where the vehicle is determined to be at a stop (step S503/YES). In a case where it is determined that the vehicle is at a stop and that the degree of abnormality of the sub-battery 22 is greater than the reference, the controller 120 may disable both the HEV traveling mode and the EV traveling mode to prevent the vehicle from making a start.

[2-3. Third Example]

Now, with reference to FIG. 7, the third example of the flow of the process performed by the control apparatus 100 will be described.

Figure 7:
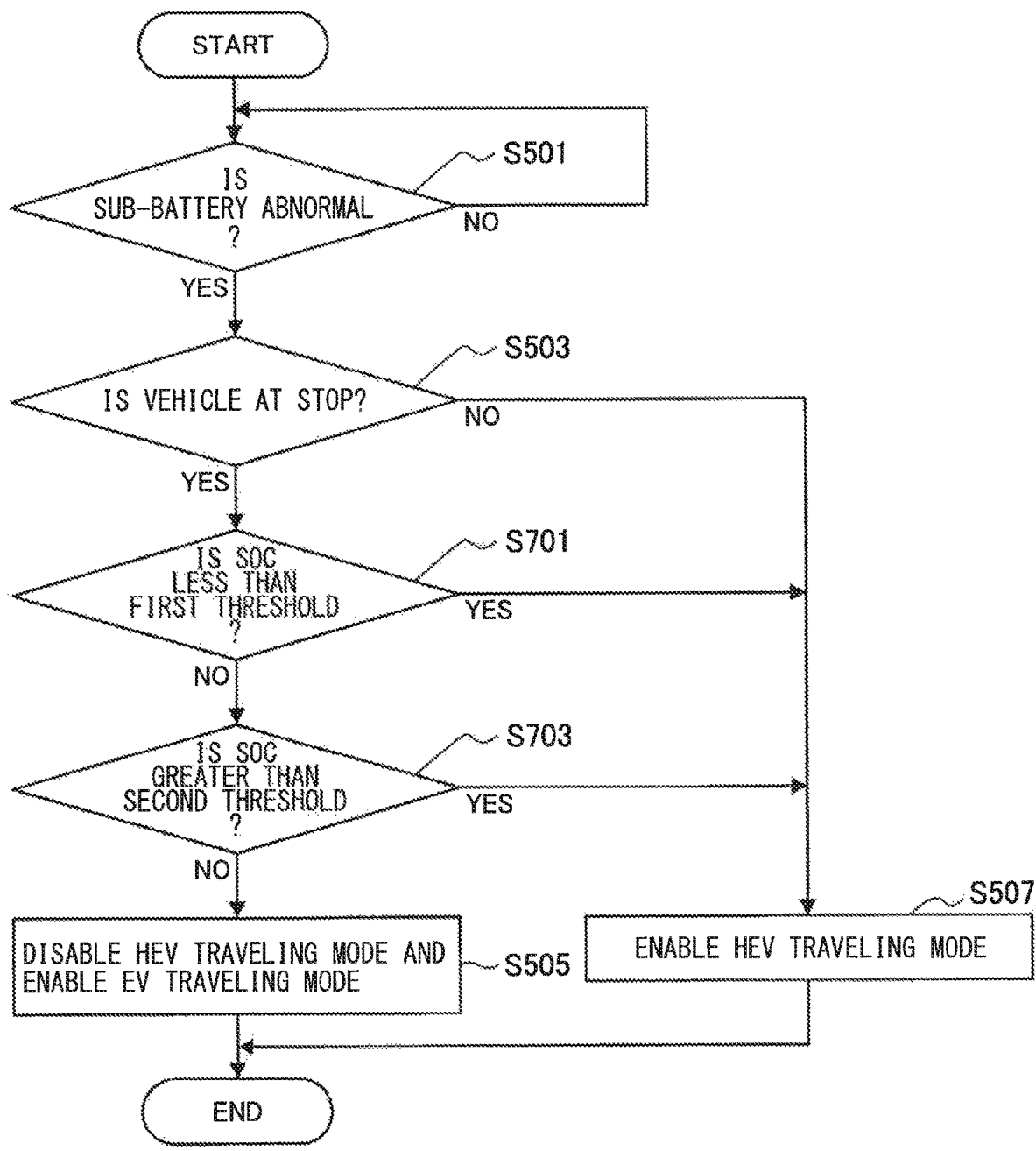
FIG. 7 is a flowchart illustrating a third example of a flow of a process that is performed by the control apparatus according to the example embodiment.

FIG. 7 is a flowchart illustrating the third example of the flow of the process performed by the control apparatus 100. In one example, like the control flow according to the first example illustrated in FIG. 5, a control flow according to the third example illustrated in FIG. 7 may be a flow of a process that is performed by the controller 120 of the control apparatus 100 and is related to switching of the traveling mode when the sub-battery 22 is abnormal. For example, as with the control related to the first example, the control apparatus 100 may be programmed to cause the controller 120 to execute the control related to the third example, at predetermined operation time intervals, after the electric power supply system 1 is activated.

The third example may differ from the first example described with reference to FIG. 5 in that the second example additionally includes processes that are directed to enabling the HEV traveling mode, regardless of the determination result of the determination process in step S503, in a case where a specific condition is satisfied. In one example, the processes may be step S701 and step S703.

In a case where the determination result is NO in step S503, the control flow according to the third example illustrated in FIG. 7 may proceed to step S507, like the control flow according to the first example illustrated in FIG. 5. In a case where the determination result is YES in step S503, the control flow according to the third example may proceed to step S701, unlike the control flow according to the first example illustrated in FIG. 5.

In a case where the determination result is YES in step S503, the controller 120 may determine whether the SOC of the main battery 21 is less than a first threshold in step S701.

In a case where the SOC of the main battery 21 is determined to be less than the first threshold (step S701/YES), the control flow may proceed to step S507. In a case where the SOC of the main battery 21 is determined to be equal to or greater than the first threshold (step S701/NO), the control flow may proceed to step S703.

Here, in the EV traveling mode, the engine 12 may be in the stopped state, unlike in the HEV traveling mode, which makes a cruising distance shorter than that in the HEV traveling mode. Furthermore, the cruising distance in the EV traveling mode may become shorter as the SOC of the main battery 21 decreases. The first threshold may be set to a value that allows appropriate determination of whether the SOC of the main battery 21 is low enough to make the cruising distance in the EV traveling mode excessively short. In other words, the SOC of the main battery 21 being determined to be less than the first threshold indicates that the cruising distance in the EV traveling mode will be excessively short.

In a case where the determination result is NO in step S701, the controller 120 may determine whether the SOC of the main battery 21 is greater than a second threshold that is larger than the first threshold in step S703. In a case where the SOC of the main battery 21 is determined to be greater than the second threshold (step S703/YES), the control flow may proceed to step S507. In a case where the SOC of the main battery 21 is determined to be equal to or less than the second threshold (step S703/NO), the control flow may proceed to step S505.

Here, in regenerative braking of causing braking force by causing the driving motor 11 to generate electric power, the electric power generated by the driving motor 11 may be supplied to the main battery 21. However, in a case where the SOC of the main battery 21 is excessively high, electric power with which the main battery 21 is chargeable may be greatly restricted, which makes it difficult to perform regenerative braking appropriately. The second threshold may be set to a value that is larger than the first threshold and allows appropriate determination of whether the SOC of the main battery 21 is high enough to greatly restrict the electric power with which the main battery 21 is chargeable. In other words, the SOC of the main battery 21 being determined to be greater than the second threshold indicates that it is difficult to perform regenerative braking appropriately, because the electric power with which the main battery 21 is chargeable is greatly restricted.

In the third example, the control flow may proceed to step S507 in a case where the determination result is YES in step S701 or a case where the determination result is YES in step S703, in addition to a case where the determination result is NO in step S503. In step S507, the controller 120 may enable the HEV traveling mode. In a case where the determination result is NO in step S703, the controller 120 may disable the HEV traveling mode and enable the EV traveling mode in step S505.

After step S505 or step S507, the control flow illustrated in FIG. 7 may end.

As described above, in the third example described with reference to FIG. 7, if the sub-battery 22 is diagnosed as being abnormal, the controller 120 may enable the HEV traveling mode, regardless of the traveling state of the vehicle, in a case where the SOC of the main battery 21 is less than a threshold (e.g., the first threshold). Thus, in a case where the cruising distance in the EV traveling mode will be excessively short, it is possible to avoid the traveling mode from being switched from the HEV traveling mode to the EV traveling mode. This makes it possible to more appropriately avoid the vehicle from becoming unable to travel when the sub-battery 22 is abnormal, which allows the vehicle to keep traveling more appropriately.

In addition, in the third example described with reference to FIG. 7, if the sub-battery 22 is diagnosed as being abnormal, the controller 120 may enable the HEV traveling mode, regardless of the traveling state of the vehicle, in a case where the SOC of the main battery 21 is greater than the second threshold larger than the first threshold. Thus, in a case where it is difficult to perform regenerative braking appropriately, because the electric power with which the main battery 21 is chargeable is greatly restricted, it is possible to avoid the traveling mode from being switched from the HEV traveling mode to the EV traveling mode. Here, in the EV traveling mode, motive power transmission between the engine 12 and the driving wheel 5 may be in a cut-off state, which makes engine braking unavailable. Therefore, in the EV traveling mode, it can be difficult to control a behavior of the vehicle appropriately in a case where it is difficult to perform regenerative braking appropriately. Accordingly, in a case where it is difficult to perform regenerative braking appropriately, it is possible to inhibit the behavior of the vehicle from becoming difficult to control appropriately, by avoiding the traveling mode from being switched from the HEV traveling mode to the EV traveling mode. This allows the vehicle to keep traveling more appropriately when the sub-battery 22 is abnormal.

It is to be noted that the control flow illustrated in FIG. 7 may be executed repeatedly in a case where the control flow proceeds to step S507 and ends with the HEV traveling mode enabled. For example, even in a case where the SOC of the main battery 21 is less than the first threshold at a point in time when an abnormality has occurred in the sub-battery 22, the SOC of the main battery 21 thereafter exceeding the first threshold may trigger the controller 120 to disable the HEV traveling mode and enable the EV traveling mode. In another example, even in a case where the SOC of the main battery 21 is greater than the second threshold at a point in time when an abnormality has occurred in the sub-battery 22, the SOC of the main battery 21 thereafter falling below the second threshold may trigger the controller 120 to disable the HEV traveling mode and enable the EV traveling mode.

Although the above description describes, as the examples of the flow of the process performed by the control apparatus 100, the first example, the second example, and the third example with reference to the control flows illustrated in FIGS. 5 to 7, a process that is performed by the control apparatus 100 is not limited to these examples.

For example, one of step S601 and step S603 may be omitted from the control flow illustrated in FIG. 6, or step S603 may be executed before step S601. Step S601 and step S603 may be the processes directed to disabling the HEV traveling mode, regardless of the determination result of the determination process in step S503. In another example, one of step S701 and step S703 may be omitted from the control flow illustrated in FIG. 7, or step S703 may be executed before step S701. Step S701 and step S703 may be the processes directed to enabling the HEV traveling mode, regardless of the determination result of the determination process in step S503. In another example, it is possible to use a control flow including both the process directed to disabling the HEV traveling mode, regardless of the determination result of the determination process in step S503 (e.g., step S601 or step S603 in the second example), and the process directed to enabling the HEV traveling mode, regardless of the determination result of the determination process in step S503 (e.g., step S701 or step S703 in the third example).

For example, in a case where the controller 120 is able to execute cruise control in which the vehicle speed is restricted within a speed limit, when the sub-battery 22 is abnormal, the controller 120 may perform, for example, a process directed to inhibiting an abrupt change in vehicle speed when the traveling mode is switched to the EV traveling mode. In one example, if the sub-battery 22 is diagnosed as being abnormal, in a case where cruise control is being executed and a requested driving force in the cruise control is greater than a motor maximum driving force, the controller 120 may gradually reduce the speed limit in a manner that the requested driving force gradually changes to become equal to or less than the motor maximum driving force. The motor maximum driving force may be a maximum value of driving force that is generatable by the driving motor 11. Thereafter, the controller 120 may disable the HEV traveling mode and enable the EV traveling mode.

For example, in a case where the sub-battery 22 is diagnosed as being abnormal, the controller 120 may disable starting of the engine 12 when the electric power supply system 1 is activated next time. In this case, enabling the EV traveling mode when the electric power supply system 1 is activated next time makes it possible to cause the vehicle to make a start, while protecting the sub-battery 22 by avoiding the charging of the sub-battery 22 using the motive power outputted from the engine 12.

For example, in a case where the sub-battery 22 being diagnosed as being abnormal triggers the HEV traveling mode to be disabled, the controller 120 may perform an additional process. For example, in terms of protecting the sub-battery 22 more effectively when the sub-battery 22 is abnormal, in a case where the HEV traveling mode is disabled, the controller 120 may reduce an output of the DCDC converter 42 as compared with a case where the HEV traveling mode is enabled. The output of the DCDC converter 42 refers to electric power supplied from the main battery 21 side to the sub-battery 22 side via the DCDC converter 42. Here, in terms of protecting the sub-battery 22 further effectively when the sub-battery 22 is abnormal, in a case where the HEV traveling mode is disabled, the controller 120 may, for example, reduce the output of the DCDC converter 42 depending on the degree of abnormality of the sub-battery 22. In one example, a degree of reduction in the output of the DCDC converter 42 may be increased with an increase in the degree of abnormality of the sub-battery 22.

[3. Example Effects of Electric Power Supply System]

Now, example effects of the electric power supply system 1 according to the example embodiment of the technology will be described.

In an electric power supply system including a main battery and a sub-battery as electric power supply sources, an abnormality can occur in the sub-battery. The main battery and the sub-battery may respectively be implemented as a high-voltage battery and a low-voltage battery, for example. When the sub-battery is abnormal, it is necessary to protect the sub-battery to prevent damage. Examples of an abnormality that occurs in the sub-battery may include a short-circuit in a cell of the sub-battery and deterioration of an electrode in a cell of the sub-battery. Here, a hybrid electric vehicle may be configured to cause an electric power generator to operate by using motive power outputted from an engine, and charge the sub-battery with electric power generated by the electric power generator. In such a hybrid electric vehicle, if the HEV traveling mode is selected when the sub-battery is abnormal, the sub-battery with the abnormality can be excessively charged, which can cause a malfunction in the sub-battery. To protect the sub-battery when the sub-battery is abnormal, a conceivable measure is to stop the electric power supply system. However, taking such a measure can make the vehicle unable to travel, and result in issues such as a decrease in convenience.

It is desirable to protect a sub-battery while allowing a vehicle to keep traveling when the sub-battery is abnormal.

In the electric power supply system 1 according to the example embodiment, the control apparatus 100 (e.g., the controller 120) is able to switch between and execute the HEV traveling mode and the EV traveling mode. The HEV traveling mode allows for traveling in a state in which the engine 12 is being driven and the starter motor 13 serving as an electric power generator is able to generate electric power. The EV traveling mode allows for traveling using the motive power of the driving motor 11 in a state in which the engine 12 is stopped. If the sub-battery 22 is diagnosed as being abnormal, the controller 120 disables the HEV traveling mode and enables the EV traveling mode. Thus, when the sub-battery 22 is abnormal, it is possible to stop the charging of the sub-battery 22 using the motive power outputted from the engine 12, by switching the traveling mode from the HEV traveling mode to the EV traveling mode. Therefore, switching to the EV traveling mode makes it possible to inhibit the sub-battery 22 with the abnormality from being overcharged, while avoiding the vehicle from becoming unable to travel. This makes it possible to protect the sub-battery 22 while allowing the vehicle to keep traveling when the sub-battery 22 is abnormal.

Furthermore, in the electric power supply system 1 according to the example embodiment, disabling the HEV traveling mode when the sub-battery 22 is abnormal prevents the traveling mode from being switched to the HEV traveling mode, which allows the driver to notice that an abnormality has occurred in the sub-battery 22. This makes it possible to prompt the driver to replace the sub-battery 22.

In the electric power supply system 1 according to the example embodiment, if the sub-battery 22 is diagnosed as being abnormal, the controller 120 may, for example, disable the HEV traveling mode and enable the EV traveling mode in a case where the vehicle is at a stop, and enable the HEV traveling mode in a case where the vehicle is traveling. Thus, it is possible to inhibit the vehicle speed from decreasing while the vehicle is traveling, by avoiding the traveling mode from being switched from the HEV traveling mode to the EV traveling mode during traveling. This makes it possible to inhibit the vehicle from being run into by a subsequent vehicle. Accordingly, it is possible to improve safety, while protecting the sub-battery 22 and allowing the vehicle to keep traveling when the sub-battery 22 is abnormal.

In the electric power supply system 1 according to the example embodiment, if the sub-battery 22 is diagnosed as being abnormal, the controller 120 may disable the HEV traveling mode and enable the EV traveling mode, regardless of the traveling state of the vehicle, in a case where the degree of abnormality of the sub-battery 22 is greater than the reference. Thus, in a case where the possibility of the sub-battery 22 being damaged by electric power supply to the sub-battery 22 is excessively high, it is possible to switch the traveling mode from the HEV traveling mode to the EV traveling mode. This makes it possible to protect the sub-battery 22 more appropriately when the sub-battery 22 is abnormal.

In the electric power supply system 1 according to the example embodiment, if the sub-battery 22 is diagnosed as being abnormal, the controller 120 may disable the HEV traveling mode and enable the EV traveling mode in a case where the vehicle is traveling and the vehicle speed of the vehicle is less than the reference speed. A decrease in vehicle speed can be caused by the traveling mode being switched from the HEV traveling mode to the EV traveling mode. In a case where, though the vehicle is traveling, the possibility of being run into by a subsequent vehicle due to the decrease in vehicle speed is sufficiently low, it is possible to switch the traveling mode from the HEV traveling mode to the EV traveling mode. Therefore, it is possible to inhibit the HEV traveling mode from being unnecessarily enabled when the sub-battery 22 is abnormal. This makes it possible to protect the sub-battery 22 more appropriately when the sub-battery 22 is abnormal.

In the electric power supply system 1 according to the example embodiment, if the sub-battery 22 is diagnosed as being abnormal, the controller 120 may enable the HEV traveling mode, regardless of the traveling state of the vehicle, in a case where the SOC of the main battery 21 is less than a threshold (e.g., the first threshold). Thus, in a case where the cruising distance in the EV traveling mode will be excessively short, it is possible to avoid the traveling mode from being switched from the HEV traveling mode to the EV traveling mode. This allows the vehicle to keep traveling more appropriately when the sub-battery 22 is abnormal.

In the electric power supply system 1 according to the example embodiment, if the sub-battery 22 is diagnosed as being abnormal, the controller 120 may enable the HEV traveling mode, regardless of the traveling state of the vehicle, in a case where the SOC of the main battery 21 is greater than the second threshold larger than the first threshold. Thus, in a case where it is difficult to perform regenerative braking appropriately, because the electric power with which the main battery 21 is chargeable is greatly restricted, it is possible to avoid the traveling mode from being switched from the HEV traveling mode to the EV traveling mode. Therefore, in such a case, it is possible to inhibit the behavior of the vehicle from becoming difficult to control appropriately by the traveling mode being switched to the EV traveling mode. This allows the vehicle to keep traveling more appropriately when the sub-battery 22 is abnormal.

The electric power supply system 1 according to the example embodiment may include the DCDC converter 42 that is able to step down the electric power stored in the main battery 21 and supply the stepped-down voltage to the sub-battery 22. In a case where the HEV traveling mode is disabled, the controller 120 may reduce the output of the DCDC converter 42 as compared with a case where the HEV traveling mode is enabled. Thus, when the sub-battery 22 is abnormal, it is possible to inhibit the sub-battery 22 from being overcharged by being charged with the electric power supplied from the main battery 21 to the sub-battery 22 via the DCDC converter 42. This makes it possible to protect the sub-battery 22 more effectively when the sub-battery 22 is abnormal.

In the electric power supply system 1 according to the example embodiment, in a case where the HEV traveling mode is disabled, the controller 120 may reduce the output of the DCDC converter 42 depending on the degree of abnormality of the sub-battery 22. Thus, when the sub-battery 22 is abnormal, it is possible to appropriately inhibit the sub-battery 22 from being overcharged by being charged with the electric power supplied from the main battery 21 to the sub-battery 22 via the DCDC converter 42, depending on the degree of abnormality of the sub-battery 22. This makes it possible to protect the sub-battery 22 further effectively when the sub-battery 22 is abnormal.

[4. Conclusion]

As described above, in the electric power supply system 1 according to the example embodiment, the controller 120 is able to switch between and execute the HEV traveling mode and the EV traveling mode. In the HEV traveling mode, the vehicle may travel in a state in which the engine 12 is being driven and the starter motor 13 serving as an electric power generator is able to generate electric power. If the sub-battery 22 is diagnosed as being abnormal, the controller 120 disables the HEV traveling mode and enables the EV traveling mode. Thus, when the sub-battery 22 is abnormal, it is possible to inhibit the sub-battery 22 from being overcharged, by stopping the charging of the sub-battery 22 using the motive power outputted from the engine 12, while avoiding the vehicle from becoming unable to travel. This makes it possible to cause the vehicle to keep traveling while protecting the sub-battery 22 when the sub-battery 22 is abnormal.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, the processes described with reference to the flowcharts in this specification do not necessarily have to be executed in the order illustrated in the flowcharts. Some processing steps may be executed in parallel. Furthermore, additional processing steps may be adopted, and some processing steps may be omitted.

For example, the above description describes, as an example of an electric power supply system according to an example embodiment of the technology, the configuration of the electric power supply system 1 with reference to FIG. 1. As mentioned above, however, a configuration of an electric power supply system according to an example embodiment of the technology is not limited to the foregoing example.

Hereinafter, with reference to FIGS. 8 to 10, electric power supply systems 2, 3, and 4 according to other example embodiments of the technology will be described as examples of an electric power supply system that is different from the electric power supply system 1. It is to be noted that FIGS. 8 to 10 merely schematically illustrate elements of the electric power supply systems 2, 3, and 4. Electric power supply systems according to example embodiments of the technology may also include, for example, the electric power supply systems 2, 3, and 4 in FIGS. 8 to 10 additionally including elements as appropriate.

Figure 8:
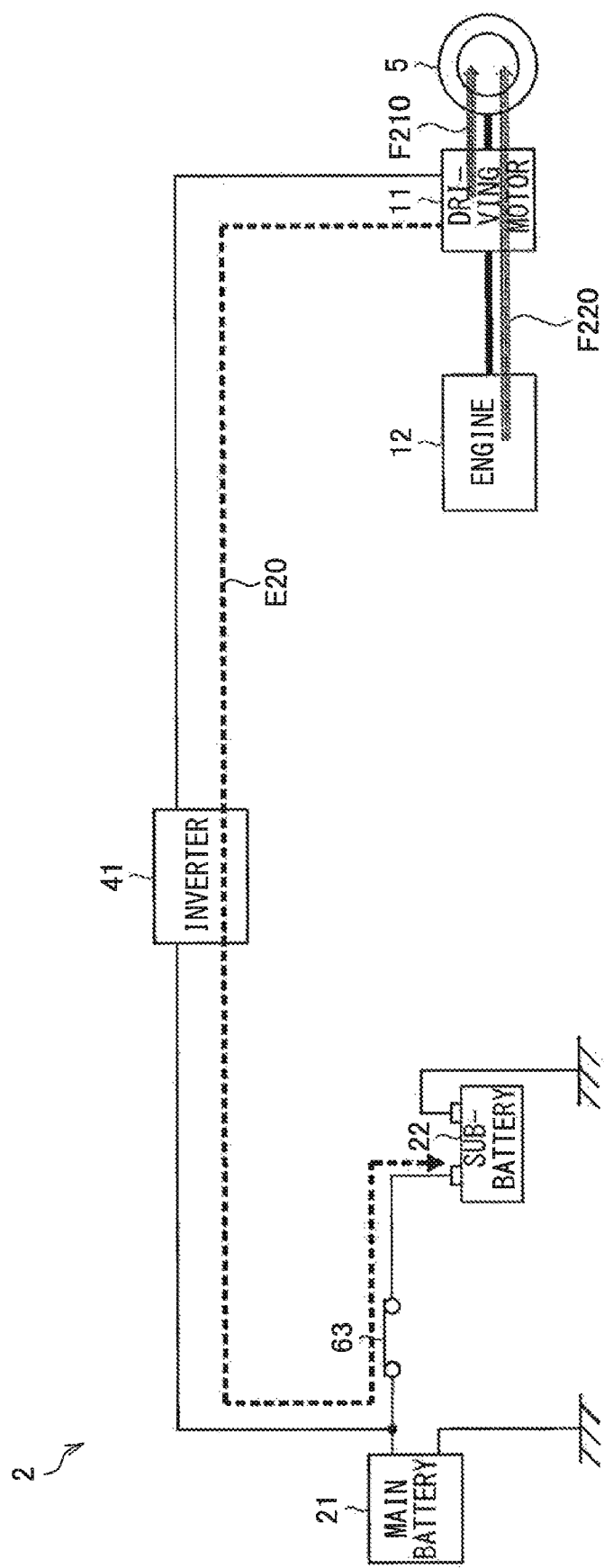
FIG. 8 is a schematic diagram illustrating an outline configuration of an electric power supply system according to one example embodiment of the technology.

The electric power supply system 2 illustrated in FIG. 8 may be a system in which, unlike in the electric power supply system 1, the main battery 21 and the sub-battery 22 are coupled to each other without the DCDC converter 42 being interposed therebetween.

In such an electric power supply system 2, in the HEV traveling mode, motive power F210 outputted from the driving motor 11 may be transmitted to the driving wheel 5, and motive power F220 outputted from the engine 12 may be transmitted to the driving wheel 5. Here, in the HEV traveling mode, the driving motor 11 is able to generate electric power by using the motive power F220 outputted from the engine 12. Thus, electric power E20 generated by the driving motor 11 may be supplied to the sub-battery 22 via the inverter 41 to charge the sub-battery 22.

In the EV traveling mode, the engine 12 may be in the stopped state. Therefore, also in the electric power supply system 2, the HEV traveling mode may be disabled and the EV traveling mode may be enabled if the sub-battery 22 is diagnosed as being abnormal. This makes it possible to inhibit the sub-battery 22 from being overcharged, by stopping the charging of the sub-battery 22 using the motive power outputted from the engine 12, while avoiding the vehicle from becoming unable to travel. It is to be noted that, if the sub-battery 22 is diagnosed as being abnormal, a relay 63 provided between the main battery 21 and the sub-battery 22 may be opened. This makes it possible to inhibit the sub-battery 22 from being overcharged by being charged with the electric power supplied from the main battery 21.

Figure 9:
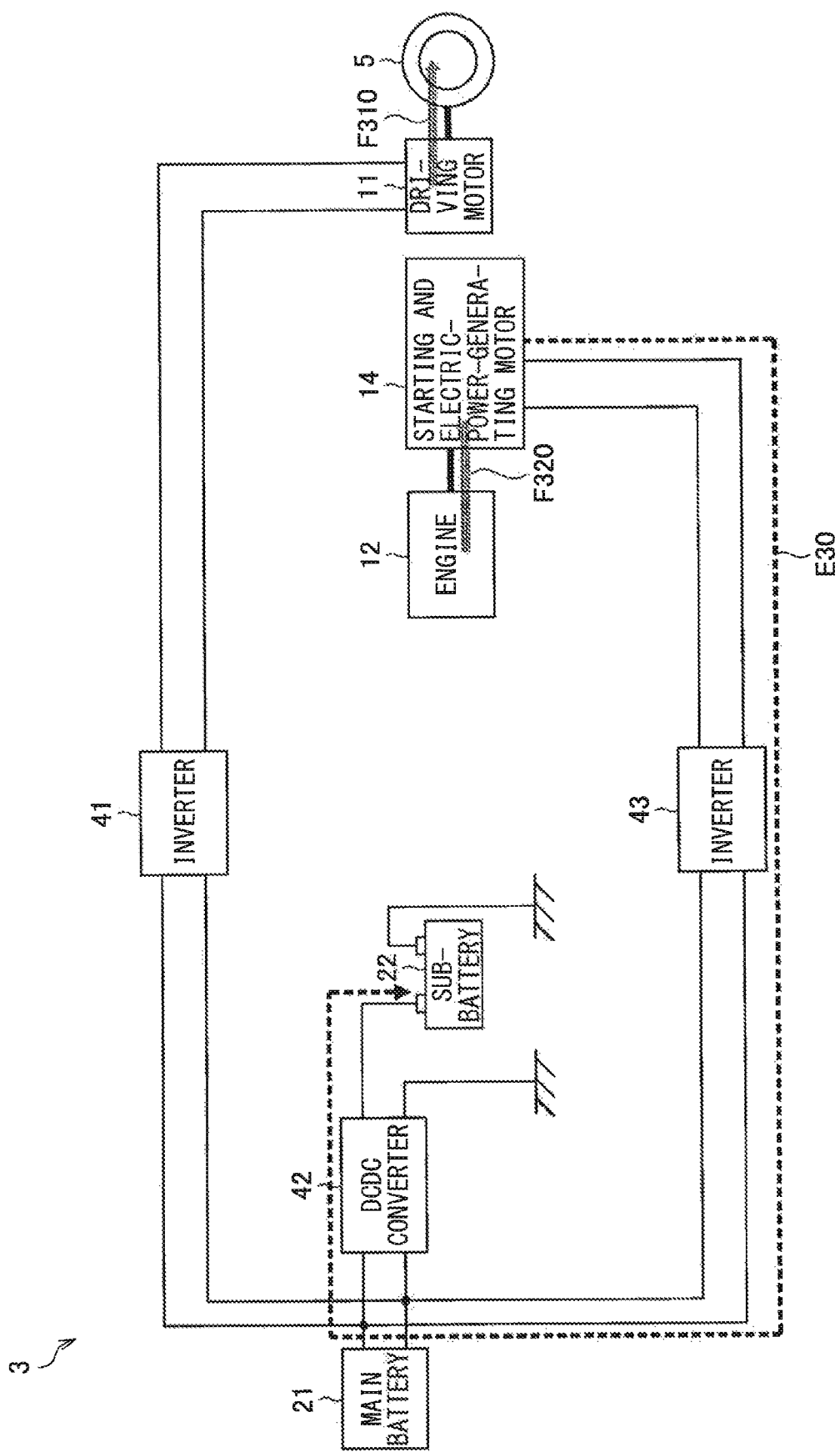
FIG. 9 is a schematic diagram illustrating an outline configuration of an electric power supply system according to one example embodiment of the technology.

The electric power supply system 3 illustrated in FIG. 9 may be an electric power supply system that is mounted on a so-called series hybrid electric vehicle. Motive power outputted from the engine 12 may be used for only driving an electric power generator that generates electric power to be supplied to the main battery 21. In the electric power supply system 3, unlike in the electric power supply system 1, the engine 12 may not be coupled to the driving wheel 5, and a starting and electric-power-generating motor 14 may be coupled to the main battery 21 via an inverter 43. The starting and electric-power-generating motor 14 may be coupled to the engine 12 and may serve as an electric power generator. In the electric power supply system 3, the starting and electric-power-generating motor 14 may start the engine 12 and generate electric power.

In such an electric power supply system 3, in the HEV traveling mode, motive power F310 outputted from the driving motor 11 may be transmitted to the driving wheel 5, and motive power F320 outputted from the engine 12 may be transmitted to the starting and electric-power-generating motor 14. Thus, electric power E30 generated by the starting and electric-power-generating motor 14 may be supplied to the main battery 21 via the inverter 43 and may thereafter be supplied to the sub-battery 22 via the DCDC converter 42 to charge the sub-battery 22. In this manner, in the HEV traveling mode, the vehicle may travel in a state in which the engine 12 is being driven and the starting and electric-power-generating motor 14 serving as an electric power generator is able to generate electric power.

In the EV traveling mode, the engine 12 may be in the stopped state. Therefore, also in the electric power supply system 3, the HEV traveling mode may be disabled and the EV traveling mode may be enabled if the sub-battery 22 is diagnosed as being abnormal. This makes it possible to inhibit the sub-battery 22 from being overcharged, by stopping the charging of the sub-battery 22 using the motive power outputted from the engine 12, while avoiding the vehicle from becoming unable to travel. It is to be noted that, if the sub-battery 22 is diagnosed as being abnormal, the output of the DCDC converter 42 may be reduced. This makes it possible to inhibit the sub-battery 22 from being overcharged by being charged with the electric power supplied from the main battery 21, as in the electric power supply system 1.

Figure 10:
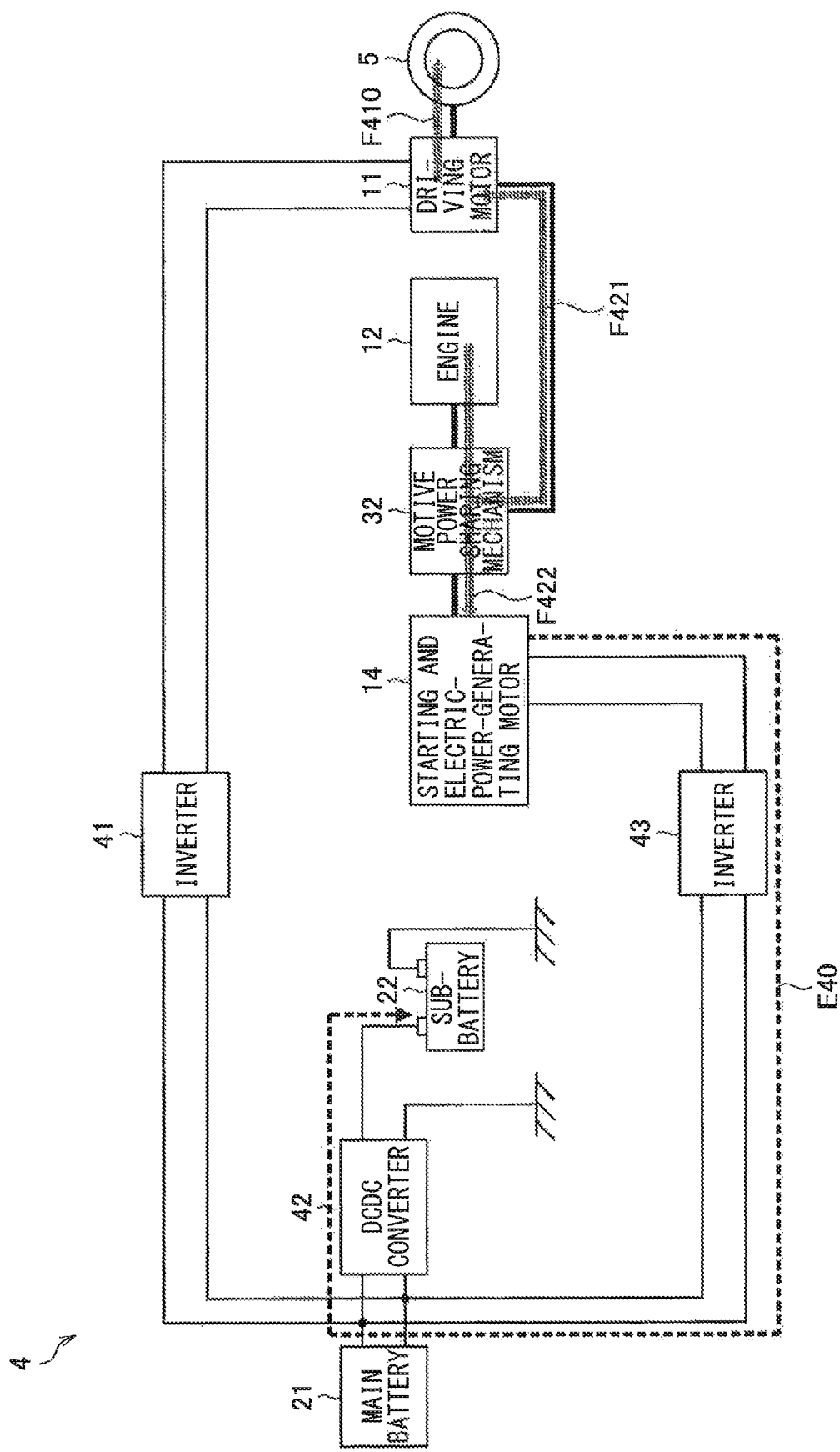
FIG. 10 is a schematic diagram illustrating an outline configuration of an electric power supply system according to one example embodiment of the technology.

The electric power supply system 4 illustrated in FIG. 10 may be an electric power supply system that is mounted on a so-called series parallel hybrid electric vehicle. Motive power outputted from the engine 12 may be supplied to be shared by an electric power generator and the driving motor 11. The electric power generator may generate electric power to be supplied to the main battery 21. The starting and electric-power-generating motor 14 may serve as the electric power generator. In the electric power supply system 4, unlike in the electric power supply system 1, the engine 12 may be coupled to the driving motor 11 and the starting and electric-power-generating motor 14, via a motive power sharing mechanism 32. The starting and electric-power-generating motor 14 may be coupled to the main battery 21 via the inverter 43. In the electric power supply system 4, the starting and electric-power-generating motor 14 may start the engine 12 and generate electric power.

In such an electric power supply system 4, motive power outputted from the engine 12 may include motive power F421 and motive power F422. In the HEV traveling mode, motive power F410 outputted from the driving motor 11 may be transmitted to the driving wheel 5, and the motive power F421 may be transmitted to the driving wheel 5. Here, in the HEV traveling mode, the motive power F422 may be transmitted to the starting and electric-power-generating motor 14. Thus, electric power E40 generated by the starting and electric-power-generating motor 14 may be supplied to the main battery 21 via the inverter 43 and may thereafter be supplied to the sub-battery 22 via the DCDC converter 42 to charge the sub-battery 22. In this manner, in the HEV traveling mode, the vehicle may travel in a state in which the engine 12 is being driven and the starting and electric-power-generating motor 14 serving as an electric power generator is able to generate electric power.

In the EV traveling mode, the engine 12 may be in the stopped state. Therefore, also in the electric power supply system 4, the HEV traveling mode may be disabled and the EV traveling mode may be enabled if the sub-battery 22 is diagnosed as being abnormal. This makes it possible to inhibit the sub-battery 22 from being overcharged, by stopping the charging of the sub-battery 22 using the motive power outputted from the engine 12, while avoiding the vehicle from becoming unable to travel. It is to be noted that, if the sub-battery 22 is diagnosed as being abnormal, the output of the DCDC converter 42 may be reduced. This makes it possible to inhibit the sub-battery 22 from being overcharged by being charged with the electric power supplied from the main battery 21, as in the electric power supply system 1.

An electric power supply system according to an example embodiment of the technology may be, for example, the electric power supply system 1 in FIG. 1 additionally including one or more elements, or the electric power supply system 1 from which one or more elements (e.g., the diagnosis relay 62) are omitted.

As described above, an example embodiment of the technology makes it possible to protect a sub-battery while allowing a vehicle to keep traveling when the sub-battery is abnormal.

The control apparatus 100 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control apparatus 100. Such a medium may take many forms, including, but not limited to, any type of magnetic medium such as a hard disk, any type of optical medium such as a CD and a DVD, any type of semiconductor memory (i.e., semiconductor circuit)

such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the control apparatus 100 illustrated in FIG. 1.

Although the technology is described hereinabove in terms of example embodiments, it is not limited thereto. It should be appreciated that variations may be made in the described example embodiments by persons skilled in the art without departing from the scope of the technology as defined by the following claims. The limitations in the claims are to be interpreted broadly based on the language employed in the claims and not limited to examples described in this specification or during the prosecution of the application, and the examples are to be construed as non-exclusive. For example, in this technology, the use of the terms first, second, etc. do not denote any order or importance, but rather the terms first, second, etc. are used to distinguish one element from another. The term "disposed on/provided on/formed on" and its variants as used herein refer to elements disposed directly in contact with each other or indirectly by having intervening structures therebetween. Moreover, no element or component in this technology is intended to be dedicated to the public regardless of whether the element or component is explicitly recited in the following claims.

The invention claimed is:

1. An electric power supply system for a hybrid electric vehicle, the hybrid electric vehicle being provided with a driving motor and an engine and being configured to switch a traveling mode between a hybrid electric vehicle (HEV) traveling mode and an electric vehicle (EV) traveling mode,
the HEV traveling mode allowing for traveling by causing both the driving motor and the engine to operate,
the EV traveling mode allowing for stopping the engine and traveling with motive power of the driving motor, the electric power supply system comprising:
a main battery configured to supply electric power to the driving motor;
an electric power generator configured to generate electric power upon receiving motive power outputted from the engine;
a sub-battery configured to be charged with electric power generated by the electric power generator; and
a control apparatus configured to be coupled with the driving motor and the engine, and configured to, when a predetermined abnormality is diagnosed as being present in the sub-battery, disable the HEV traveling mode to stop charge of the battery with electric power generated by the electric power generator, and enable the EV traveling mode as the traveling mode of the hybrid electric vehicle,
wherein the control apparatus is further configured to select the traveling mode, between the HEV traveling mode and the EV traveling mode, depending on a requested driving force of the vehicle when the abnormality is diagnosed as being absent in the sub-battery.

2. The electric power supply system according to claim 1, wherein the control apparatus is configured to, when the abnormality is diagnosed as being present in the sub-battery, disable the HEV traveling mode and enable the EV traveling mode in a case where the vehicle is at a stop, and enable the HEV traveling mode in a case where the vehicle is traveling.

3. The electric power supply system according to claim 2, wherein the control apparatus is configured to, when the abnormality is diagnosed as being present in the sub-battery, disable the HEV traveling mode and enable the EV traveling mode, regardless of a traveling state of the vehicle, in a case where a degree of the abnormality of the sub-battery is greater than a reference.

4. The electric power supply system according to claim 2, wherein the control apparatus is configured to, when the abnormality is diagnosed as being present in the sub-battery, disable the HEV traveling mode and enable the EV traveling mode in a case where the vehicle is traveling and a vehicle speed of the vehicle is less than a reference speed.

5. The electric power supply system according to claim 3, wherein the control apparatus is configured to, when the abnormality is diagnosed as being present in the sub-battery, disable the HEV traveling mode and enable the EV traveling mode in a case where the vehicle is traveling and a vehicle speed of the vehicle is less than a reference speed.

6. The electric power supply system according to claim 2, wherein the control apparatus is configured to, when the abnormality is diagnosed as being present in the sub-battery, enable the HEV traveling mode, regardless of a traveling state of the vehicle, in a case where a remaining capacity of the main battery is less than a predetermined first threshold.

7. The electric power supply system according to claim 3, wherein the control apparatus is configured to, when the abnormality is diagnosed as being present in the sub-battery, enable the HEV traveling mode, regardless of a traveling state of the vehicle, in a case where a remaining capacity of the main battery is less than a predetermined first threshold.

8. The electric power supply system according to claim 6, wherein the control apparatus is configured to, when the abnormality is diagnosed as being present in the sub-battery, enable the HEV traveling mode, regardless of the traveling state of the vehicle, in a case where the remaining capacity of the main battery is greater than a second threshold that is larger than the first threshold.

9. The electric power supply system according to claim 7, wherein the control apparatus is configured to, when the abnormality is diagnosed as being present in the sub-battery, enable the HEV traveling mode, regardless of the traveling state of the vehicle, in a case where the remaining capacity of the main battery is greater than a second threshold that is larger than the first threshold.

10. The electric power supply system according to claim 1, further comprising a DCDC converter configured to step down an output voltage of the main battery and apply the stepped-down voltage to the sub-battery,
wherein the control apparatus is configured to, in a case where the HEV traveling mode is disabled, reduce an output of the DCDC converter as compared with a case where the HEV traveling mode is enabled.

11. The electric power supply system according to claim 2, further comprising a DCDC converter configured to step down an output voltage of the main battery and apply the stepped-down voltage to the sub-battery,
wherein the control apparatus is configured to, in a case where the HEV traveling mode is disabled, reduce an output of the DCDC converter as compared with a case where the HEV traveling mode is enabled.

12. The electric power supply system according to claim 3, further comprising a DCDC converter configured to step down an output voltage of the main battery and apply the stepped-down voltage to the sub-battery,
wherein the control apparatus is configured to, in a case where the HEV traveling mode is disabled, reduce an output of the DCDC converter as compared with a case where the HEV traveling mode is enabled.

13. The electric power supply system according to claim 10, wherein the control apparatus is configured to, in a case where the HEV traveling mode is disabled, reduce the output of the DCDC converter, depending on a degree of the abnormality of the sub-battery.

14. The electric power supply system according to claim 11, wherein the control apparatus is configured to, in a case where the HEV traveling mode is disabled, reduce the output of the DCDC converter, depending on a degree of the abnormality of the sub-battery.

15. The electric power supply system according to claim 12, wherein the control apparatus is configured to, in a case where the HEV traveling mode is disabled, reduce the output of the DCDC converter, depending on a degree of the abnormality of the sub-battery.

16. A control system for a hybrid electric vehicle that is provided with a driving motor and an engine, the control system being configured to switch a traveling mode between a hybrid electric vehicle (HEV) traveling mode and an electric vehicle (EV) traveling mode,
the HEV traveling mode allowing for traveling by causing both the driving motor and the engine to operate,
the EV traveling mode allowing for stopping the engine and traveling with motive power of the driving motor,
the control system comprising:
a main battery configured to supply electric power to the driving motor;
an electric power generator configured to generate electric power upon receiving motive power outputted from the engine;
a sub-battery configured to be charged with the electric power generated by the electric power generator; and
a control apparatus coupleable to the driving motor and the engine, and configured to
diagnose whether a predetermined abnormality is present in the sub-battery,
select the traveling mode, between the HEV traveling mode and the EV traveling mode, depending on a requested driving force of the vehicle in a normal case where the abnormality is diagnosed as being absent in the sub-battery, and
select the EV traveling mode, regardless of the requested driving force, in an abnormal case where the abnormality is diagnosed as being present in the sub-battery.

17. The electric power supply system according to claim 1, wherein the control apparatus is further configured to select the EV traveling mode, regardless of the requested driving force, in an abnormal case where the abnormality is diagnosed as being present in the sub-battery.

18. The electric power supply system according to claim 1, further comprising a DCDC converter configured to step down an output voltage of the main battery and apply the stepped-down voltage to the sub-battery.

19. The electric power supply system according to claim 18, wherein the control apparatus is further configured to, in a case where the HEV traveling mode is disabled, change an output of a DCDC converter as compared with a case where the HEV traveling mode is enabled.

\* \* \* \* \*